US012667991B2

(12) United States Patent
Chabirand-Garconnet et al.

(10) Patent No.: US 12,667,991 B2
(45) Date of Patent: Jun. 30, 2026

(54) SUCTION CUTTING CONVEYOR FOR AN AUTOMATIC BLADE CUTTING MACHINE FOR SHEET MATERIALS

(71) Applicant: LECTRA, Paris (FR)

(72) Inventors: Didier Chabirand-Garconnet, Cestas (FR); Regis Lallement, Cestas (FR); Thierry Geoffroy, Pessac (FR)

(73) Assignee: LECTRA, Paris (FR)

(*) Notice: Subject to any disclaimer, the term of this patent is extended or adjusted under 35 U.S.C. 154(b) by 409 days.

(21) Appl. No.: 18/008,883

(22) PCT Filed: Jun. 22, 2021

(86) PCT No.: PCT/FR2021/051137
§ 371 (c)(1),
(2) Date: Dec. 7, 2022

(87) PCT Pub. No.: WO2021/260320
PCT Pub. Date: Dec. 30, 2021

(65) Prior Publication Data

US 2023/0211518 A1 Jul. 6, 2023

(30) Foreign Application Priority Data

Jun. 24, 2020 (FR) ....................................... 2006636

(51) Int. Cl.
*B26D 7/01* (2006.01)
*B26D 7/06* (2006.01)
*B26D 7/08* (2006.01)

(52) U.S. Cl.
CPC ........... *B26D 7/018* (2013.01); *B26D 7/0625* (2013.01); *B26D 7/088* (2013.01)

(58) Field of Classification Search
CPC ............... Y10T 83/168; Y10T 83/0453; Y10T 83/0443; Y10T 83/207; Y10T 83/2066;
(Continued)

(56) References Cited

U.S. PATENT DOCUMENTS 4,322,993 A * 4/1982 Stumpf .................. B65H 5/224 198/689.1
4,542,672 A * 9/1985 Pearl .................. A41H 43/0242 226/93

(Continued)

FOREIGN PATENT DOCUMENTS

CN 107954229 A 4/2018
EP 0517143 A2 12/1992

(Continued)

OTHER PUBLICATIONS

French Search Report from corresponding French Application No. FR 2006636, Mar. 12, 2021.

(Continued)

*Primary Examiner* — Phong H Nguyen
(74) *Attorney, Agent, or Firm* — Workman Nydegger

(57) ABSTRACT

A suction cutting conveyor of an automatic blade cutting machine for sheet materials, including a plurality of cutting supports rigidly connected to a drive mechanism driven along rectilinear and curvilinear trajectories, each cutting support including a plurality of bristles each having a foot rigidly connected to a sole and a head opposite to the foot and on which a sheet material to be cut is intended to rest, the sole of each cutting support being capable of being able to elastically deform following the trajectories of the drive mechanism.

13 Claims, 3 Drawing Sheets

(58) Field of Classification Search
CPC ............ Y10T 83/2072; Y10T 83/2096; Y10T 83/2092; Y10T 83/2098; Y10T 83/2109; Y10T 83/2111; Y10T 83/2185; Y10T 83/2192; B26D 7/018; B26D 7/0625; B26D 7/088; B26D 7/0658; B26D 7/0633; B26D 7/20; B26D 2007/208
USPC ............................................ 198/689.1, 688.1
See application file for complete search history.

(56) References Cited

U.S. PATENT DOCUMENTS

| | | | | |
|---|---|---|---|---|
| 5,001,954 | A * | 3/1991 | Andrada Galan | B26D 7/018 198/689.1 |
| 5,197,160 | A * | 3/1993 | Smith | A47L 5/14 15/345 |
| 5,412,836 | A * | 5/1995 | Kuchta | B08B 5/04 15/309.1 |
| 5,730,431 | A * | 3/1998 | Cattini | B25B 11/005 269/21 |
| 8,650,998 | B2 * | 2/2014 | Badie | B26D 7/20 83/100 |
| 9,156,618 | B2 | 10/2015 | Mercade et al. | |
| 11,845,611 | B2 | 12/2023 | Balsells Mercade et al. | |
| 2003/0019342 | A1 * | 1/2003 | Zanesi | B26D 7/20 83/402 |
| 2003/0089579 | A1 | 5/2003 | Kuchta et al. | |

FOREIGN PATENT DOCUMENTS

| | | | |
|---|---|---|---|
| EP | 2656987 | A1 | 10/2013 |
| FR | 2003043 | A1 | 11/1969 |
| JP | S60144252 | A | 7/1985 |
| JP | H0442139 | U | 4/1992 |
| JP | 6188057 | B2 | 8/2017 |
| JP | 2022533115 | A | 7/2022 |

OTHER PUBLICATIONS

International Search Report from corresponding PCT Application No. PCT/FR2021/051137, Oct. 22, 2021.
Japanese Office Action from Corresponding Japanese Patent Application No. JP2022-570335, Mar. 3, 2025.
Korean Office Action from Corresponding Korean Patent Application No. KR1020227041981, Dec. 10, 2025.

* cited by examiner

SUCTION CUTTING CONVEYOR FOR AN AUTOMATIC BLADE CUTTING MACHINE FOR SHEET MATERIALS

TECHNICAL FIELD

The present invention relates to a suction conveyor for an automatic cutting machine for sheet materials, particularly textile materials, by means of a vibrating blade penetrating into the cutting support.

PRIOR ART

One field of application of the invention is that of automatically cutting stacks or mats of sheets of material, particularly textile material, by means of a vibrating blade penetrating into a suction cutting support.

Typically, a cutting machine with a vibrating blade comprises in particular a cutting conveyor which serves to drive the stack of sheets during the cutting operation. This cutting conveyor is housed in a box inside which a strong vacuum is established in order to hold immobile the sheets of material to be cut during the cutting operation.

In this type of machine, the cutting conveyor also serves as a penetrating cutting support for the vibrating blade. It is in fact well known to make the cutting support penetrable by the blade so that, during the cutting operation, the blade can not only pass completely through the material to be cut, but also extend downward beyond the support surface and into the bed of material supplying such a surface.

To this end, as shown schematically in FIG. 1, the conveyor 1 generally comprises a plurality of cutting supports 2, each of which is rigidly connected to a belt 3 of a driving conveyor. This conveyor also comprises, at each end of the table, a sprocket 5 centered on a horizontal axle 4 and driving the belt 3 along rectilinear and curvilinear trajectories.

Moreover, each cutting support 2 comprises a plurality of bristles 6 mounted on a sole 7 while forming several parallel rows of bristles, each bristle having a head forming the support for the sheet material to be cut. Passages cut through the sole allow the suction air to pass. These cutting supports thus allow supporting the material to be cut under vacuum while being able to be penetrated by the cutting blade.

However, an assembly of this type has a considerable disadvantage during the rotation of conveyor at the end of the table. In fact, as shown in FIG. 1, during the rotation of the cutting supports at the end of the table (to cause them to reverse direction), the latter winding around the sprocket 5 and having a tendency to open (i.e. to separate from one another).

On the one hand, the pivoting of the cutting supports forces the material discharge reeds 8 at the end of the cutting surface to be positioned at a height h above the cutting surface. But this difference in height is harmful for the user of the cutting machine because, when the cutting mat M passes, the material can be deformed by stretching and thus impact the cut pieces at this end or during the loading of the mat (side opposite to the unloading), the material is stretched, then compressed during the vacuum application phase, thus creating stresses in this material which would degrade the quality of the cut pieces.

On the other hand, the material discharge reeds 8 must be positioned in vertical offset from the horizontal axles 4 for driving the sprockets 5 of the conveyor in order to avoid an opening zone between the cutting supports creating a separation at the head of the bristle where the material can fall in if the combs do not prevent it. This constraint requires having long combs subjected to vacuum and requiring dimensioning them based on these constraints. Depending on the width of the cutting supports, the distance between the drive and the head of the cutting supports and the connection between the supports and the drive, the useful cutting length may be found to be reduced to avoid this zone.

DISCLOSURE OF THE INVENTION

The invention therefore has as its object to propose a cutting support which does not have the aforementioned disadvantages.

This object is achieved due to a suction cutting conveyor of an automatic blade cutting machine for sheet material, comprising a plurality of cutting supports rigidly connected to a drive mechanism driven along rectilinear and curvilinear trajectories, each cutting support comprising a plurality of bristles each having a foot rigidly connected to a sole and a head opposite to the foot and on which a sheet material to be cut is intended to rest, in which, in conformity with the invention, the sole of each cutting support is capable of being able to elastically deform following the trajectories of the drive mechanism.

What is meant here by "able to elastically deform" is that the sole of the cutting supports has intrinsic characteristics which confer upon it a property of deformation in the elastic range, i.e. a reversible deformation without creep by which the sole, upon the stresses being released, returns to its original shape.

The invention is notable in that each of the cutting supports has a sole which has a degree of flexure in the transverse direction, which allows them to deform to follow the trajectories of the drive mechanism, particularly during the rotation of the conveyor at the upstream and downstream ends of the table to reverse direction. The invention is also notable in that the plane of the drive mechanism of the cutting supports is located in the plane of the sole of the cutting supports.

In this manner, the gap between the cutting supports is reduced, which allows further extension of the cutting surface with identical conveyor dimensions. Moreover, the cutting supports—and more particularly their respective soles—deform but do not pivot, which allows lowering the combs or rakes at the upstream and downstream ends of the cutting surface. Thus it is possible to avoid the material being deformed by stretching, with all the problems that this generates.

The sole of each cutting support can have a plurality of parallel geometric shapes which extend along directions perpendicular to the direction of advance of the drive mechanism to allow elastic deformation following the trajectories of the drive mechanism. These shapes allow the sole to be able to be flexible while still holding the bristles perpendicular to the tangent to this sole, even during the operating period.

In this case, the geometric shapes of the sole of the cutting supports can consist of a plurality of parallel slots. The slots of the sole can comprise external slots protruding outward with respect to an outer surface of the sole and/or internal slots protruding inward with respect to an inner surface of the sole. The slots of the sole can comprise an alternation of external slots and internal slots so as to give the shape of an accordion. The slots can have a rectangular, square or rounded cross section.

The sole of each cutting support can be made of plastic material, this material needing to be compatible with the deformations induced during operation.

Each of the cutting supports can be mounted by its respective sole on a transmission member of the drive mechanism by means of at least one fastening batten.

In this case, each cutting support can be mounted on the transmission member of the drive mechanism by means of at least two fastening battens, spaced longitudinally from one another. At least one of the two fastening battens can cooperate with two adjacent cutting supports.

Preferably, the conveyor further comprises a device for cleaning the cutting supports using air. The air cleaning device can comprise an air blowing nozzle and a dust collector.

The invention also has as its object an automatic blade cutting machine for sheet materials, comprising a conveyor as previously defined.

DESCRIPTION OF THE EMBODIMENTS

Figure 2:
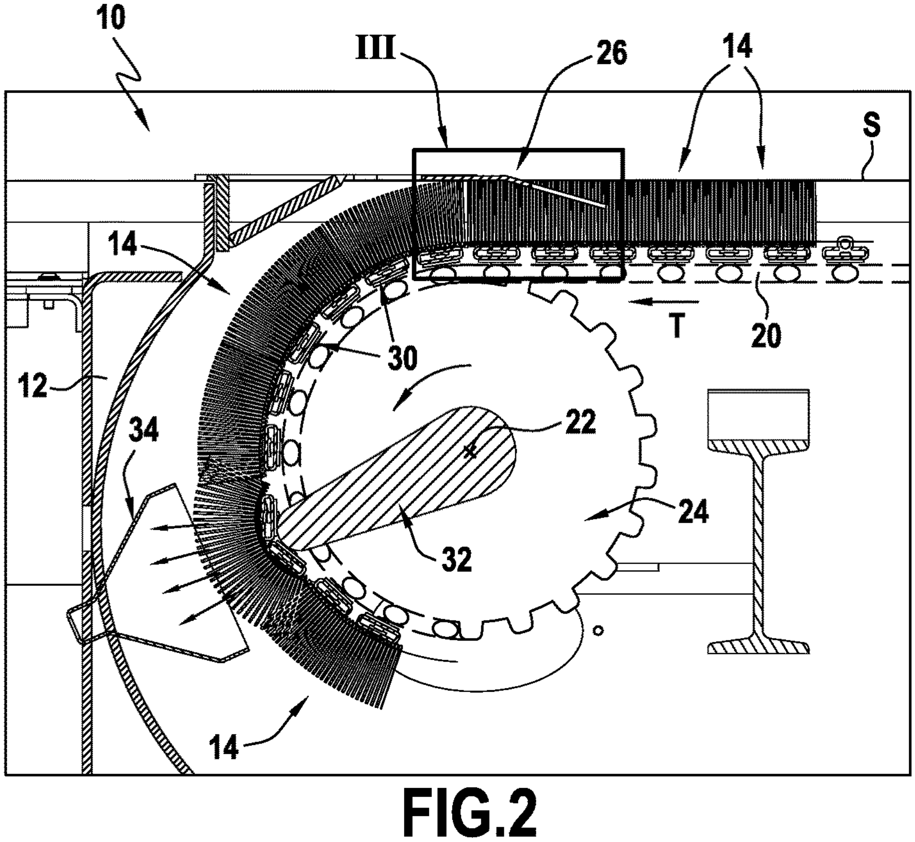
FIG. 2 shows one end of the suction cutting conveyor equipped with a plurality of cutting supports according to one embodiment of the invention.

The present invention relates to cutting supports for a suction cutting conveyor of an automatic blade cutting machine for sheet materials, such as the conveyor 10 partially shown in FIG. 2.

In known fashion, a cutting conveyor 10 of this type serves to drive the stack of sheets during the cutting operation. This cutting conveyor 10 is typically housed in a box 12 inside of which a strong vacuum is establish in order to hold immobile the sheets of material to be cut during the cutting operation.

Moreover, the cutting conveyor also served as a penetrating cutting support for the vibrating blade. It is in fact well known to make the cutting support penetrable by the blade so that during the cutting operation, the blade not only be able to pass completely through the material to be cut, but also extend downward beyond the support surface and into the bed of material providing such a surface.

The cutting conveyor 10 generally comprises a plurality of cutting supports 14. Each cutting support comprises a plurality of bristles 16, each having a foot 16*a* mounted on a sole 18 while forming several parallel rows of bristles, and a head 16*b* opposite to the foot and on which the sheet material to be cut is intended to rest (see FIG. 3).

The cutting supports 14 are mounted by means of their respective soles on a drive belt 20 driven at each end of the table by sprockets 24 centered on horizontal axles 22. The drive belt 20 is thus driven along rectilinear (between the two ends of the cutting table) and curvilinear (at each end of the cutting table, to reverse direction) trajectories.

Of course, the drive belt could be replaced by a chain, a cog belt or any other drive mechanism.

Figure 4:
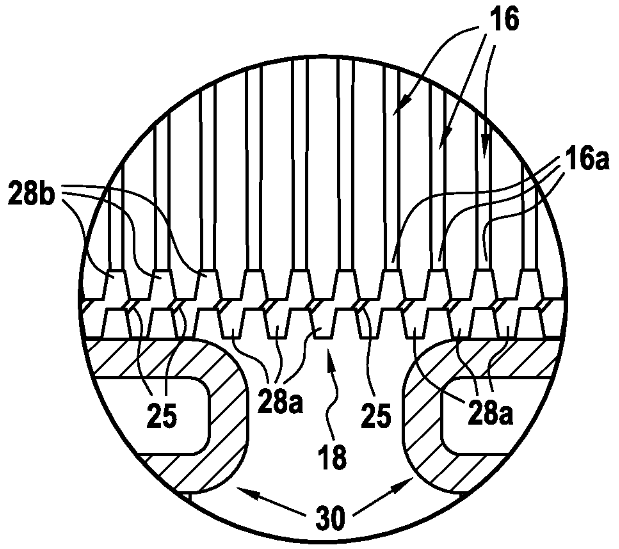
FIG. 4 is a magnification of FIG. 3 showing more precisely the shape of the sole of the cutting supports of FIG. 2.

Moreover, in known fashion, transverse channels 25 are provided through the soles of the cutting supports in order to allow the suction air to pass through the soles (FIG. 4).

The cutting supports thus allow supporting the material to be cut under vacuum while still being able to be penetrated by the cutting blade. They delimit the cutting surface S of the cutting machine.

Figure 1:
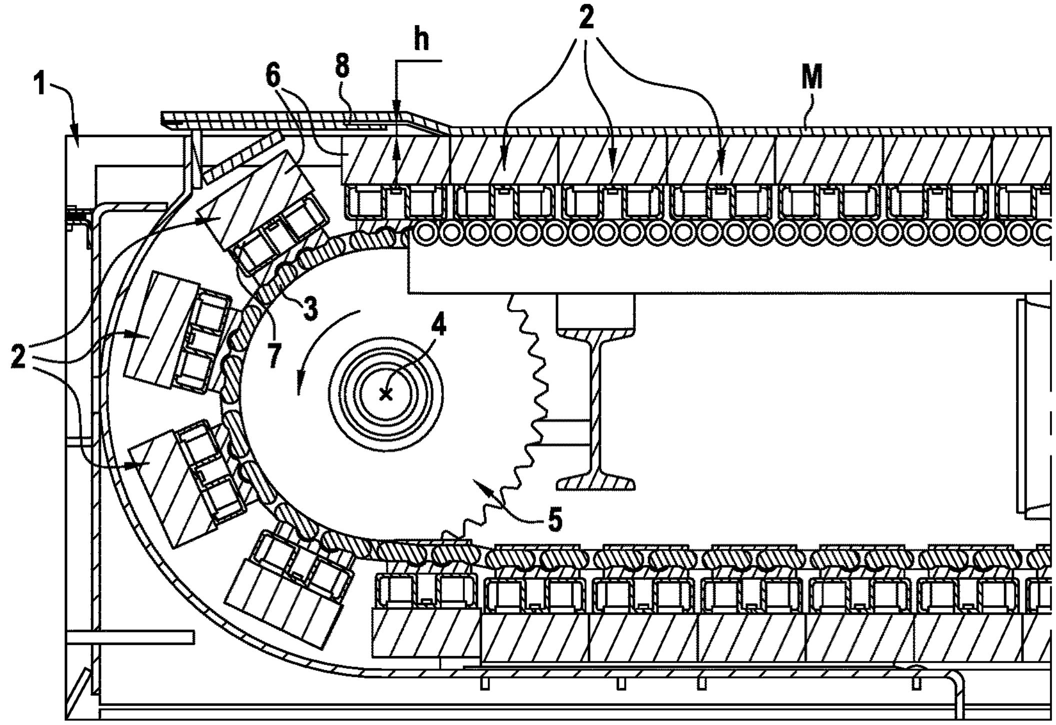
FIG. 1 (already discussed) is seen schematically from one end of the cutting table of the prior art.

Moreover, at the longitudinal end of the cutting surface S (with respect to the direction of advance T of the cutting conveyor), the cutting table comprises a plurality of discharge reeds 26 which are generally elevated with respect to the cutting surface (see the prior art of FIG. 1). These discharge reeds 26 extend over the entire width of the cutting surface and thus allow helping with the discharge of the material out of the cutting surface.

Similarly, at the opposite longitudinal end of the cutting surface S, the cutting table also comprises a plurality of loading reeds (not shown in the figures) which are generally elevated with respect to the cutting surface and which allow helping with the loading of the material on the cutting surface.

According to the invention, the sole 18 on which are mounted the bristles 16 of the different cutting supports is capable of being able to elastically deform following the trajectories of the drive belt 20.

What is meant here by "able to elastically deform" is that the sole of the cutting supports has intrinsic characteristics which confer upon it an elastic deformation property.

Several embodiments can be contemplated to arrive at this intrinsic property of the soles of the cutting supports.

Figure 3:
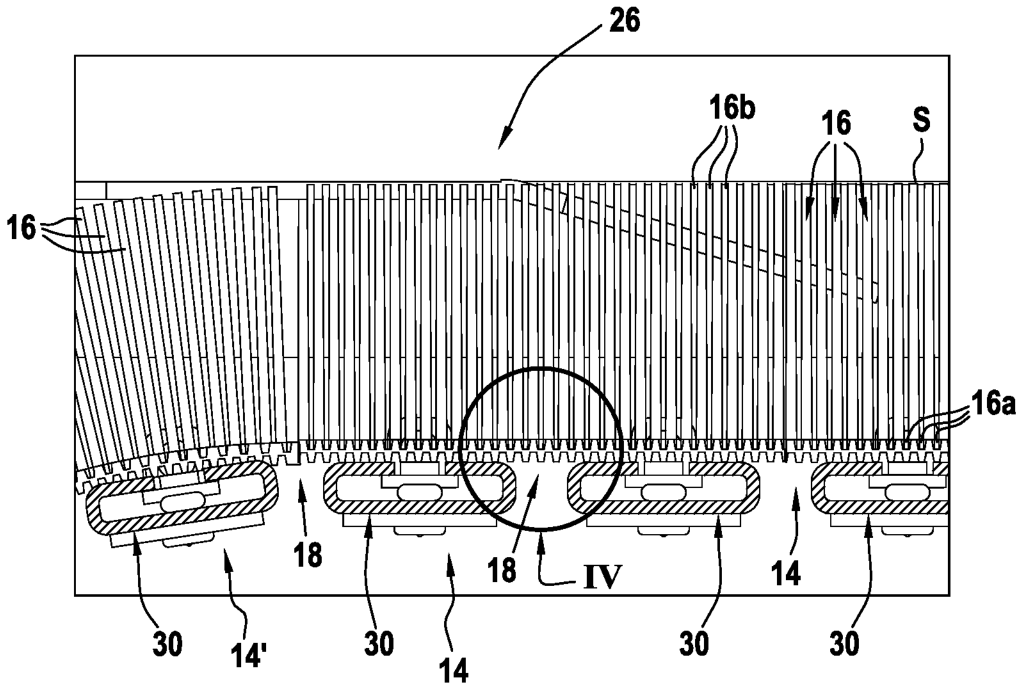
FIG. 3 is a magnification of FIG. 2 showing more precisely the cutting supports of FIG. 2 at the discharge reeds of the cutting surface.
Figure 5:
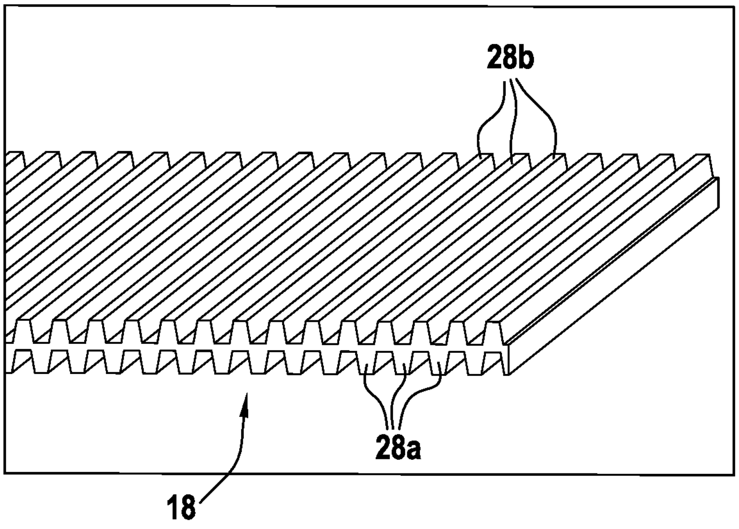
FIG. 5 shows in perspective and partially the sole of the cutting supports of FIG. 2.

Thus, in the embodiment of FIGS. 3 to 5, the sole 18 of each cutting support has a plurality of parallel geometric shapes which extend along directions perpendicular to the direction of advance of the drive belt to allow elastic deformation following the trajectories of the drive belt.

More precisely, the geometric shapes of the sole of the cutting supports consist here of a plurality of parallel slots (or folds) which extend in a transverse direction (i.e. extending in a direction perpendicular to the direction of advance T of the cutting conveyor).

Still more precisely, the slots consist of external slots 28*a* protruding outward from the sole and internal slots 28*b* protruding toward the inside of the support.

In this embodiment, as shown in FIGS. 4 and 5, the slots 28*a*, 28*b* are arranged alternately so as to give the shape of an accordion to the sole, conferring upon it its property of ability to deform plastically.

The presence of the slots 28*a*, 28*b* in an accordion shape allows the sole of the cutting support according to the invention to elastically deform in bending in the direction of advance T of the cutting conveyor.

In this embodiment, the slots have a rectangular cross section. This cross section could alternatively be square or rounded.

Likewise the slots of the sole could be present on only one of the two faces of the sole (i.e. protruding only outward or inward from the sole).

In this embodiment, elastic deformation is made possible due to the particular shape of the sole. It thus allows, on the one hand, avoiding too great an opening between adjacent cutting supports, and on the other hand limiting, or reducing to zero, the elevation height of the discharge reeds 26 with respect to the cutting surface S.

Figure 6:
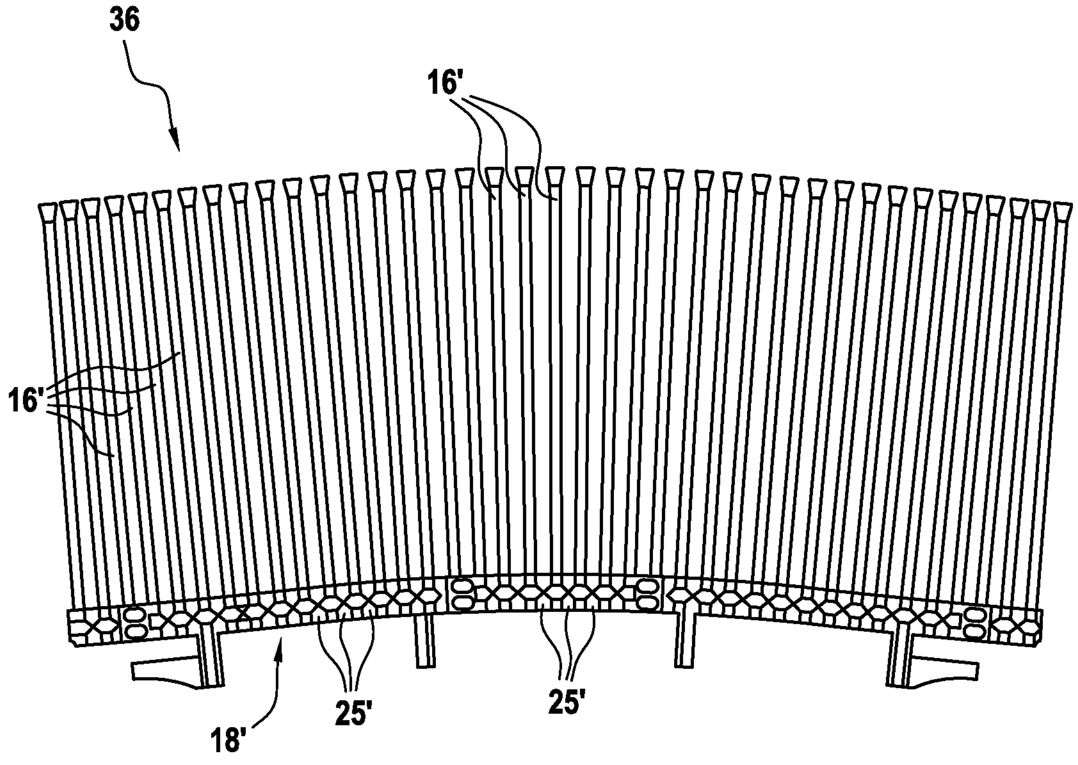
FIG. 6 shows schematically the deformation of a sole of a cutting support according to a variant embodiment of the invention.

In another embodiment of the invention shown in particular in FIG. 6, the sole 18' of the cutting supports has intrinsic characteristics which confer upon it an elastic deformation property due to its composition.

In fact, in this embodiment, the sole 18' is made of a plastic material capable of allowing elastic deformation following the trajectories of the drive mechanism (in FIG. 6, the sole 18' is in a deformed state).

For example, a plastic material can be selected for example among the families of polyamides or polypropylenes.

More precisely, FIG. 6 shows a modular element 36 for cutting support as described in detail in patent application FR 20/03043, filed on 27 Mar. 2020 by the Applicant.

This modular element 36 comprises a plurality of bristles 16' arranged according to the same identical line and the respective feet of which are rigidly connected to a sole 18' made of a plastic material capable of allowing elastic deformation.

In this embodiment, the sole 18' is provided with a plurality of transverse channels 25' for the passage of suction air.

In another embodiment (not shown in the figures), the sole and the bristles of a cutting support are made of different (particularly plastic) materials.

Different features of the cutting support, regardless of its embodiment, will now be described.

In particular, different configurations are possible for the assembly of cutting supports according to the invention on the drive belt 20.

In the embodiment shown in FIGS. 2 and 3, each cutting support 14 is mounted on the drive belt 20 by means of two fastening battens 30 spaced longitudinally from one another.

Of course, other configurations can be contemplated. For example, in another embodiment (not shown in the figures), each cutting support can be mounted on the drive belt by means of three fastening battens spaced longitudinally from one another.

Still in another embodiment, each cutting support is mounted on the drive belt by means of three fastening battens; one fastening batten mounted only on the batten, and two other fastening battens mounted commonly on the cutting support and on the two adjacent cutting supports.

According to an advantageous arrangement of the invention illustrated in FIG. 2, the cutting conveyor 10 can further comprise a device for cleaning the cutting supports 14 using air.

This cleaning device comprises in particular an air blowing nozzle 32 which is mounted on the horizontal axle 22 of one of the sprockets 24 and which extends along its radius. During the rotation of the drive belt around the horizontal axle 22, the nozzle 32 is supported against the outer face of the sole of the cutting supports and blows air through it to detach dust and impurities lodged at the bottom of the sole. A collector 34 positioned facing the cutting support on the side of the head of the bristles allows recovering the dust thus dislodged.

It will be noted that the invention applies equally well to cutting conveyors using discharge and loading reeds as to those using loading and discharge rakes instead.

The invention claimed is:

1. A suction cutting conveyor of an automatic blade cutting machine for sheet material, the conveyor comprising:

a plurality of cutting supports rigidly connected to a drive mechanism driven along rectilinear and curvilinear trajectories, each cutting support comprising a plurality of bristles each having a foot rigidly connected to a sole and a head opposite to the foot and on which a sheet material to be cut is intended to rest, wherein the conveyor is housed in a box having a vacuum configured to hold immobile the material sheet during cutting operations, wherein the sole of each cutting support elastically deforms by a reversible deformation without creep following the trajectories of the drive mechanism and wherein transverse channels are provided through the soles of the cutting supports in order to allow suctioned air to pass through the soles, wherein the sole is arranged to return to an original shape following the reversible deformation, and wherein the sole comprises a plurality of parallel slots including external slots protruding outward with respect to an outer surface of the sole and internal slots protruding inward with respect to an inner surface of the sole.

2. The conveyor according to claim 1, wherein the sole of each cutting support has a plurality of parallel geometric shapes which extend along directions perpendicular to the direction of advance of the drive mechanism to allow elastic deformation following the trajectories of the drive mechanism.

3. The conveyor according to claim 2, wherein the geometric shapes of the sole of the cutting supports consist of a plurality of parallel slots.

4. The conveyor according to claim 3, wherein the slots of the sole comprise an accordion-like shaped alternation of external slots and internal slots.

5. The conveyor according to claim 3, wherein the slots have a rectangular, square or rounded cross section.

6. The conveyor according to claim 1, wherein the sole of each cutting support is made of plastic material.

7. The conveyor according to claim 1, wherein each of the cutting supports is mounted by a respective sole on a transmission member of the drive mechanism by at least one fastening batten.

8. The conveyor according to claim 7, wherein each cutting support is mounted on the transmission member of the drive mechanism by means of at least two fastening battens, spaced longitudinally from one another.

9. The conveyor according to claim 8, wherein at least one of the two fastening battens cooperates with two adjacent cutting supports.

10. The conveyor according to claim 1, further comprising a device for cleaning the cutting supports using air.

11. The conveyor according to claim 10, wherein the air cleaning device comprises an air blowing nozzle and a dust collector.

12. An automatic blade cutting machine for sheet materials comprising a conveyor according to claim 1.

13. A suction cutting conveyor of an automatic blade cutting machine for sheet material, comprising:

a plurality of cutting supports rigidly connected to a drive mechanism driven along rectilinear and curvilinear trajectories, each cutting support comprising a plurality of bristles each having a foot rigidly connected to a sole and a head opposite to the foot and on which a sheet material to be cut is intended to rest, wherein the sole of each cutting support elastically deforms by a reversible deformation without creep following the trajectories of the drive mechanism;

wherein the sole is arranged to return to an original shape following the reversible deformation;

wherein the sole of each cutting support comprises a plurality of slots having external slots protruding outward with respect to an outer surface of the sole and internal slots protruding inward with respect to an inner surface of the sole, the plurality of slots of the sole including an alternation of the external slots and the internal slots.

* * * * *